Patented May 21, 1940

2,201,508

UNITED STATES PATENT OFFICE 2,201,508

MANUFACTURE OF ZIRCONIUM COMPOUNDS

Daniel Tyrer, Stockton-on-Tees, England

No Drawing. Application April 21, 1939, Serial No. 269,257. In Great Britain June 27, 1938

4 Claims. (Cl. 23—24)

This invention is based on the observation that when a solution containing zirconium and sulphuric acid in such proportion that the normal zirconium sulphate $Zr(SO_4)_2$ may be supposed to be present, is treated with lime or other alkaline earth in such proportion that the precipitated alkaline earth sulphate includes about half, but not more than 60 per cent., of the sulphate ions originally present as $Zr(SO_4)_2$, the solution contains an unstable basic sulphate of zirconium which, however, after filtration from the alkaline earth sulphate, may be sufficiently stabilized for further treatment by the addition of a small proportion of hydrochloric acid. This filtrate to which the hydrochloric acid has been added may then be caused to yield the whole of its zirconium in the form of a heavy granular precipitate of another basic sulphate on addition of a hydroxide or carbonate of zirconium and in the course of some hours, which period may be shortened by heating to a moderate temperature.

A portion of this precipitate may be treated with an alkali or alkali carbonate to afford the zirconium hydroxide or carbonate required for the precipitation of another batch of solution of the unstable basic sulphate of zirconium.

This invention relates to the application of the foregoing observation in any process for making zirconium compounds from a source of crude zirconium oxide such as a finely ground zirconium oxide ore or a zirconia residue. A suitable process is indicated in the following description:—

The finely ground oxide material is heated with sulphuric acid sufficient to produce $Zr(SO_4)_2$ and the mass is leached with water. The solution containing impurities, such as sulphate of iron and alumina, is treated at a temperature of 60° C. with milk of lime in such proportion that 50–60 per cent of the $Zr(SO_4)_2$ can form calcium sulphate; the mass is filtered quickly and to the filtrate is added 2–10 per cent. of its weight of HCl. The calcium sulphate may be washed first with untreated zirconium sulphate solution and then with water or dilute sulphuric acid, before it is discarded, the washings being used in leaching a fresh batch of sulphatized raw material.

To the filtrate from the calcium sulphate is added a quantity of zirconium hydroxide or carbonate such that in the mass the molecular ratio of $ZrO_2$ to $SO_4$ is approximately 1:0.6. If much iron or other impurities be present, hydrochloric acid to the extent of some 3–6 per cent. of the mass should be added. The mixture is then kept at a temperature of about 90° C. for several hours, when a heavy granular precipitate of a basic sulphate is formed which may be washed with dilute hydrochloric acid.

This basic sulphate may be decomposed by alkali hydroxide or ammonia or alkali carbonate and the hydroxide or carbonate of zirconium thus obtained may in part be used for the purpose specified above.

I claim:

1. In a manufacture of zirconium compounds from a crude zirconium oxide material the improvement which consists in treating a solution of the sulphatised material containing zirconium and sulphuric acid in the proportion to produce $Zr(SO_4)_2$ with an alkaline earth metal base in such proportion that the precipitated alkaline earth metal sulphate includes about half, but not exceeding 60 per cent. of the sulphate ions originally present as $Zr(SO_4)_2$, filtering the solution rapidly from the alkaline earth sulphate and adding a small proportion of hydrochloric acid to the filtrate, whereafter a zirconium compound from the group consisting of the hydroxide and carbonate is added to produce a tardy precipitation of a basic zirconium sulphate suitable for conversion into other zirconium compounds.

2. A manufacture of a basic zirconium sulphate wherein a solution of a sulphatised crude zirconium oxide material containing sulphuric acid and zirconium in the proportion to form $Zr(SO_4)_2$ is treated by precipitating therefrom between 50 and 60 per cent of the sulphate ions originally present as $Zr(SO_4)_2$ in the form of an alkaline earth metal sulphate by addition of an alkaline earth metal base, quickly filtering the solution from the alkaline earth metal sulphate, mixing the filtrate with 2–10 per cent of its weight of HCl and then precipitating from this filtrate a basic zirconium sulphate by adding a zirconium compound from the group consisting of the hydroxide and carbonate.

3. In the manufacture claimed in claim 2 the step of hastening the final precipitation of basic zirconium sulphate by heating the solution to a temperature about 90° C.

4. In the manufacture claimed in claim 2 the step of providing the zirconium compound from the group consisting of hydroxide and carbonate required for a second batch by decomposing the necessary quantity of the basic zirconium sulphate produced in the first batch with an alkaline compound from the group consisting of alkali metal hydroxide, alkali metal carbonate, ammonium hydroxide and ammonium carbonate.

DANIEL TYRER.